THERMOPLASTIC INFORMATION STORAGE SYSTEM

Original Filed Dec. 29, 1958 3 Sheets-Sheet 1

Inventor:
William E. Glenn Jr.,
by Richard R. Brainard
His Attorney.

THERMOPLASTIC INFORMATION STORAGE SYSTEM

Original Filed Dec. 29, 1958 3 Sheets-Sheet 2

Inventor: William E. Glenn Jr., by Richard R. Brainard His Attorney.

Oct. 25, 1966 W. E. GLENN, JR 3,281,798

THERMOPLASTIC INFORMATION STORAGE SYSTEM

Original Filed Dec. 29, 1958 3 Sheets-Sheet 3

Inventor:
William E. Glenn, Jr.
by Richard R. Brainard
His Attorney.

3,281,798
Patented Oct. 25, 1966

3,281,798

THERMOPLASTIC INFORMATION STORAGE SYSTEM

William E. Glenn, Jr., Scotia, N.Y., assignor to General Electric Company, a corporation of New York Continuation of application Ser. No. 783,558, Dec. 29, 1958. This application June 11, 1965, Ser. No. 472,749
8 Claims. (Cl. 340—173)

Figures 1, 2, 3, 4:
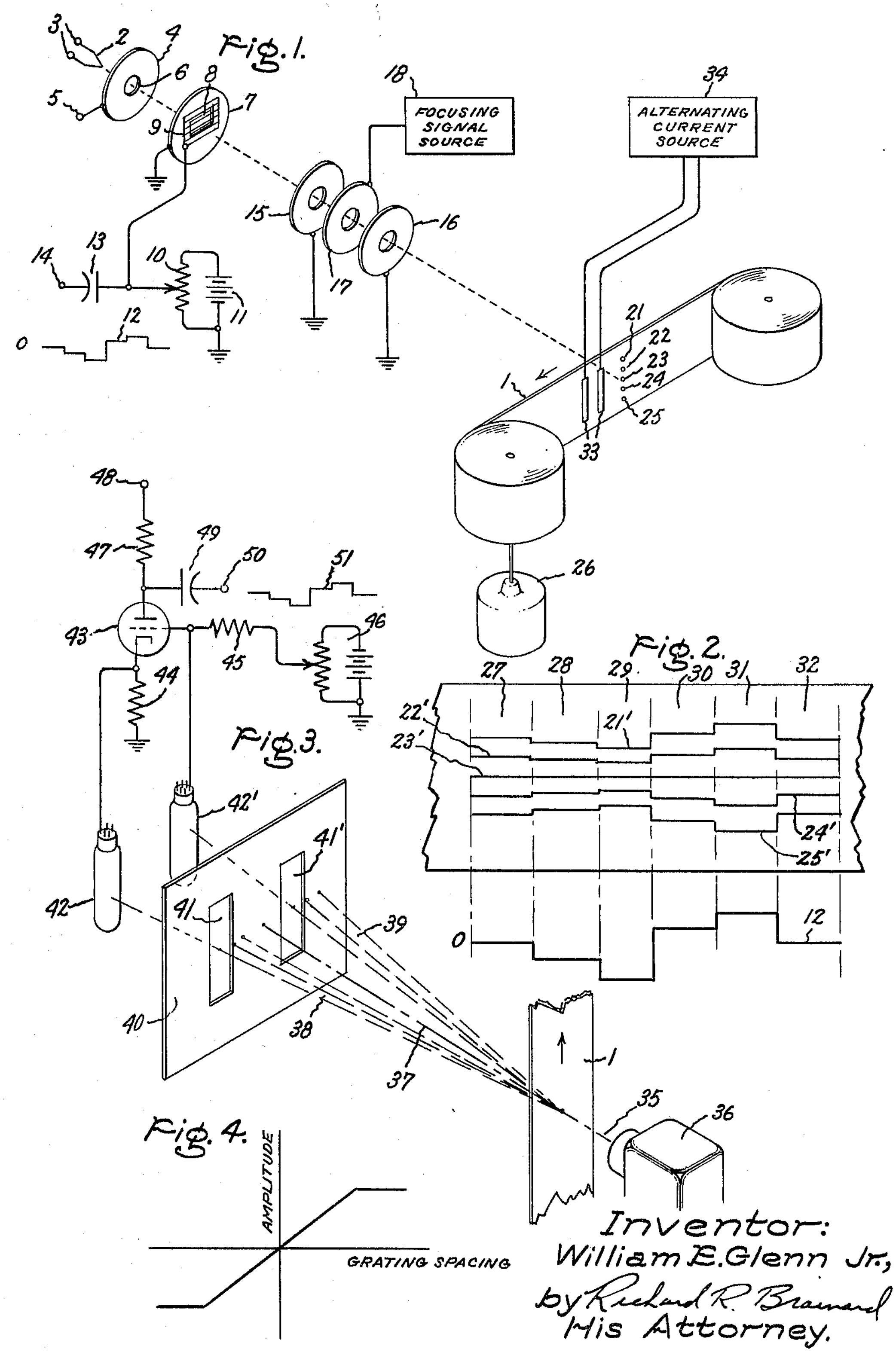

This application is a continuation of my copending application Serial No. 783,558, filed December 29, 1958 (now abandoned), as a continuation-in-part of my then copending application Serial No. 698,167, filed November 22, 1957 (now abandoned). The subject matter of application Serial No. 698,167 is claimed in U.S. Patent No. 3,113,179, granted December 3, 1963, and U.S. Patent No. 3,147,062, granted September 1, 1964. The patents issued respectively on continuation-in-part application Serial No. 8,842, filed February 15, 1960, and a division thereof Serial No. 84,424, filed January 23, 1961.

The present invention relates to an information storage system in which information is stored in the form of diffraction gratings.

The present application is directed to the type of information storage system in which applied information in the form of electrical signals is stored in a medium and then "read out" at a later date. The "read out" operation involves transducing the information stored in the medium such that electrical signals are produced that are either representative of or identical to the initial applied electrical signals. In the past, these storage systems have been bulky and weighty in comparison to the amount of information they store. Thus, they have serious disadvantages when used in applications where large amounts of information must be stored or in locations, such as in airplanes, where size and weight must be kept to a minimum.

It is, therefore, an object of the present invention to provide a new and improved information storage system.

Another object is to provide an information storage system in which the size and weight of the system are small in comparison to the amount of information stored, as compared to prior storage systems.

These and other objects are achieved in a preferred embodiment of my invention in which the information is stored as diffraction gratings in a thermoplastic coated tape. These gratings are formed by an electron charge pattern produced by an electron beam modulated with the applied electrical signals. This electron beam is deflected over the thermoplastic surface where it produces lines of electron charge the separations between which are a function of the amplitude of the applied electrical signals. Then the thermoplastic surface is heated to a plastic condition to permit the lines of electron charge to deform the surface into grating lines corresponding to these lines of charge. Thus, the grating line spacing is a function of the amplitude of the applied electrical signals. Or, in other words, the electrical signals are stored in the form of diffraction gratings in the thermoplastic coated medium. When it is desired to read out this stored information, the tape is run through an optical apparatus in which light is diffracted by these grating lines. Photosensitive devices are positioned such that the amount of diffracted light incident thereon is a function of the grating line spacings. Consequently, the output electrical signals from these photosensitive devices correspond to the initial applied electrical signals.

Figures 5, 5A, 6, 7:
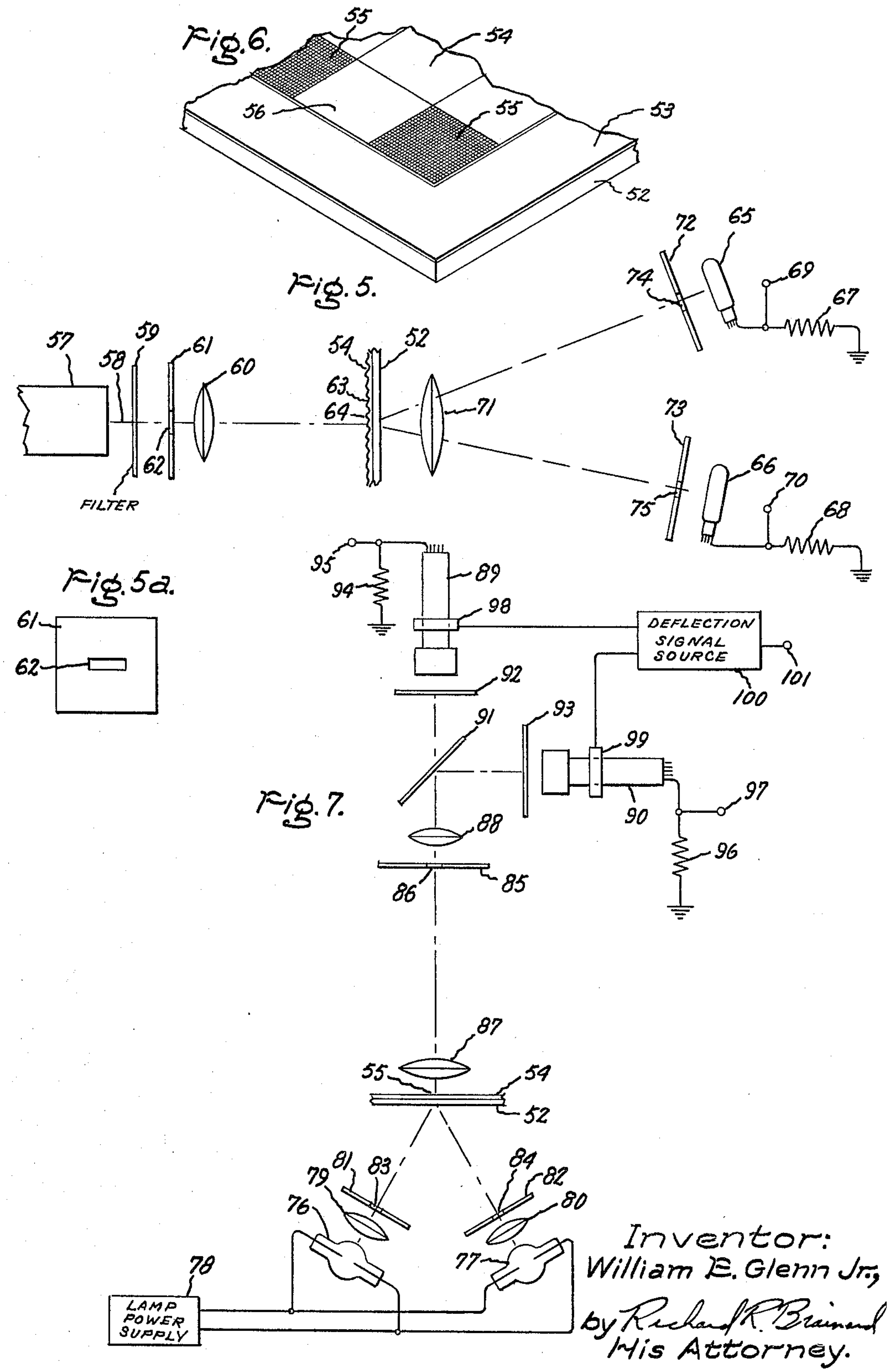
Figure 2A:
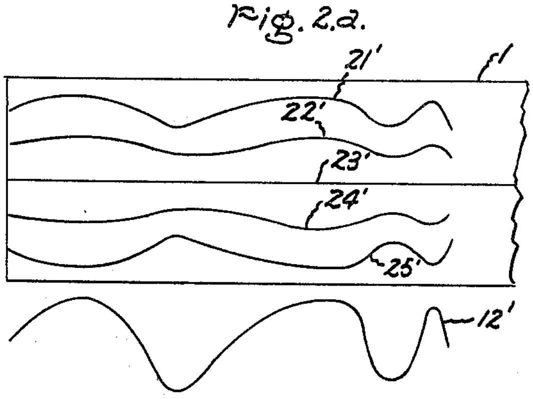
Figure 8:
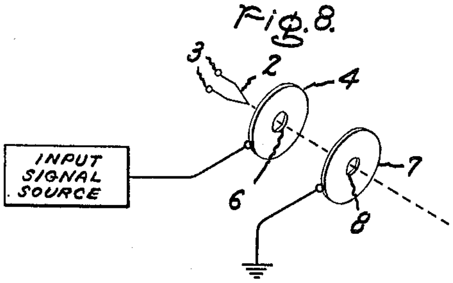
Figure 9:
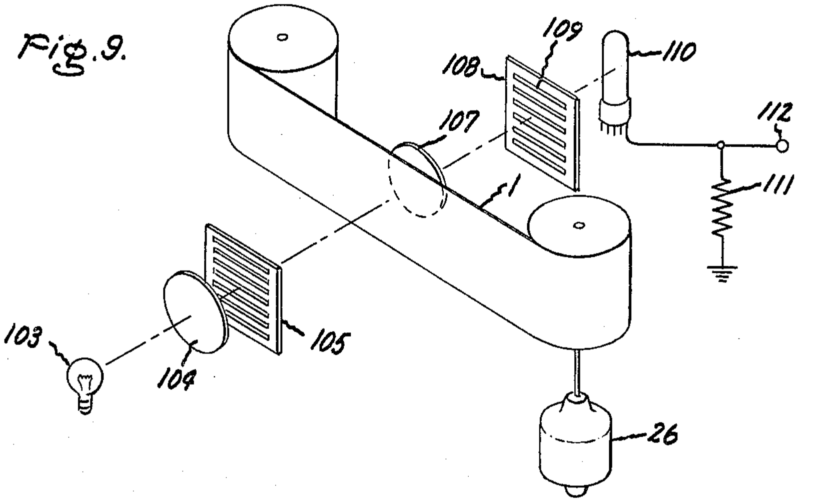

The novel features believed characteristic of the invention are set forth in the appended claims. The invention itself, together with further objects and advantages thereof may best be understood by reference to the following description, taken in connection with the accompanying drawings, in which:

FIG. 1 is a perspective view of an electron beam writing apparatus for forming lines of charge on a deformable medium with separations that are a function of applied electrical signals, FIG. 2 is an enlarged view of a portion of the deformable medium illustrated in FIG. 1 which more clearly shows the separations between the lines of electron charge, FIG. 2A is an enlarged view of a portion of the deformable medium upon which the lines of charge have separations that are a function of an applied continuous electrical signal, FIG. 3 is a perspective view of a read out apparatus for transducing the information stored in the deformable medium by the electron beam apparatus illustrated in FIG. 1, FIG. 4 is a graph of the response of the apparatus of FIG. 3, FIG. 5 is a schematic illustration of a readout apparatus for transducing digital information stored in the deformable medium illustrated in FIG. 6, FIG. 5A is a plan view of a component of the apparatus of FIG. 5, FIG. 6 is a perspective view of a portion of a deformable medium in which digital information has been stored therein by diffraction gratings arranged in a form of a plurality of blocks, FIG. 7 is a schematic illustration of another readout apparatus for transducing the information stored in the deformable medium illustrated in FIG. 6, FIG. 8 is a schematic illustration of a portion of the electron beam writing apparatus of FIG. 1 as modified for forming lines of charge on a deformable medium with charge densities that are a function of applied electrical signals, and FIG. 9 is a perspective view of a readout apparatus for transducing the information stored in a deformable medium by an electron beam writing apparatus in which part of the writing structure is that illustrated in FIG. 8.

In FIG. 1 there is illustrated an electron beam writing apparatus for forming in a storage medium illustrated as a thermoplastic coated tape 1, diffraction gratings with grating spacings that are a function of the amplitude of applied electrical signals. To be more specific, this electron beam writing apparatus forms an electron charge pattern on the thermoplastic surface of tape 1, and it is this charge pattern that forms the diffraction gratings.

Before the discusion of the electron beam writing apparatus, the thermoplastic tape 1 will be described in more detail. Tape 1 is preferably formed of three layers of material all of which are preferably optically clear. The surface layer—the layer subjected to the electron beam—is formed from thermoplastic material such as polystyrene of medium molecular weight. Optimum results are had in the formation of the diffraction gratings if the thickness of this thermoplastic is about half the diffraction grating line spacings. However, the thickness is not critical. This thermoplastic surface layer is secured by a conducting cuprous iodide film to a base layer that may, for example, be formed of mylar. The thickness of the cuprous iodide film and of the mylar base are not critical, but preferably the mylar base is much thicker than the thermoplastic surface layer and may be of the order of several mils thick. There is a more detailed discussion of suitable thermoplastic materials in my copending application Serial No. 698,167. In this application, systems for forming diffraction gratings in thermoplastic materials are described and claimed.

The electron beam writing apparatus, which forms the charge pattern in tape 1, is positioned with tape 1 in an evacuated enclosure (not shown) and which may, for example, be of the type illustrated and described in my above-mentioned copending application. This apparatus comprises a source of an electron beam, a splitter which splits the single electron beam into several beams that are mutually convergent at angles that are a function of the magnitudes of the applied electrical signals, and a focusing system for focusing the several beams on tape 1 with vertical separations along a vertical line.

The source of the electron beam may have components that are similar to the corresponding components in a conventional cathode ray or television tube. As illustrated, this source includes a filament 2 which is heated by a source of electrical energy (not shown) that is connected to the input terminals 3 for filament 2. Preferably, filament 2 is maintained at a large negative potential below ground by a potential source (not shown) connected to one of the input terminals 3. The beam of electrons emitted by filament 2 is controlled in magnitude by a potential supplied to a control electrode 4 from a potential source (not shown) connected to an input terminal 5. The electrons passing through an aperture 6 in electrode 4 are then accelerated by the difference in potential between filament 2 and ground potential applied to an anode 7. Thus, the beam potential is equal to the difference in potential between anode 7 and filament 2, which difference is equal to the magnitude of the negative potential applied to filament 2. Anode 7 is provided with an aperture 8 that is a great deal larger than is necessary for the passage of these electrons. The electrons extend only over a small central portion of aperture 8.

After the beam has been formed, controlled in magnitude, and accelerated, it is split by a beam splitter into a plurality of converging beams that converge at angles that are a function of the magnitude of the applied electrical signals. This splitter comprises a plurality of wires 9 arranged parallel with the long dimension of tape 1, which in FIG. 1 is the horizontal direction. They extend across aperture 8 in anode 7 and are insulated from anode 7 by suitable means (not shown). Although only four wires 9 are illustrated, in actual practice there are many more. Typically, there may be 75 wires, but the number of wires subtended by the beam is much less. That is, the beam impinges upon only a few wires near the center of the splitter structure. The number of wires so impinged upon should be between three and nine as is explained in detail in my copending application Serial No. 782,958, filed December 24, 1958 now Patent No. 3,065,295, and assigned to the assignee of the present invention and in which electron beam splitting systems are described and claimed. For the present discussion it will be assumed that the beam intercepts four wires, and thus it is split into five beams.

The reason for using a large number of wires 9 is to obtain more uniform potential gradients in the regions in which the beam passes. The more uniform gradients provide a more uniform converging action.

Wires 9 are energized by the resultant of several voltages. They are maintained several hundred volts above ground potential, and thus above the potential of anode 7, by a potentiometer 10 connected across a direct voltage source 11. These wires 9 are also energized by the applied electrical signal 12, which is illustrated as a voltage wave of step wave form for convenience of illustration. Wave 12 is coupled to these wires 9 through a capacitor 13 from a terminal 14. Thus, the total potential applied to wires 9 is the potential tapped off from potentiometer 10 plus that of the applied electrical signal 12.

The operation of the beam splitter depends upon different potential gradients between wires 9 and anode 7. That is, the beam portions passing through the spaces between wires 9 are acted upon by different potential gradients that cause these beam portions to converge at different angles as if they had originated from separate spaced sources. These different potential gradients result from the different distances from the different wires 9 to anode 7.

Assume for purposes of explanation that the beam subtends four wires. Then the two portions of the electron beams passing between anode 7 and the two end wires 9 of these four, which are the wires of these four that are closest to the horizontal edges of aperture 8, are acted upon by large transverse potential gradients resulting from the proximity of these end wires 9 to these edges. These beam portions are caused, by these gradients, to converge at large equal angles toward the axis of the electron beam writing apparatus. The two beam portions passing between these two end wire 9 and the wires 9 adjacent to them are obviously acted upon by transverse potential gradients of lesser magnitude. Therefore, these beam portions converge towards the axis at equal lesser angles. The center beam portion, which is not acted upon by any transverse potential gradients, is not diverted. It is seen therefore, that the four wires 9 subtended by the electron beam produce potential gradients that split the single electron beam into five smaller electron beams, the center one of which is not diverted but the two beams on either side of which converge towards this center beam at angles that are a function of the potential gradients and thus of the potentials applied to wires 9. Consequently, it can be said that waveform 12 controls the convergence of these beams. This is important to note since the grating line spacings of the resulting diffraction gratings depend upon the angles of convergence of these beams.

The five beams obtained from the splitting operation are focused with vertical separations along a vertical line on tape 1 by a focusing system illustrated as an einzel lens comprising three circular electrodes 15, 16, and 17. The center electrode 17 is maintained at several kilovolts, preferably negative, by a potential from a focusing signal source 18. The end electrodes 15 and 16 are grounded.

Optimum focusing is obtained if the converging beams have a point of cross-over in the focusing system. Of course the position of this cross-over point varies with the angles of convergence of these beams. The more they converge the greater the distance of the cross-over point from tape 1. Due to this cross-over point, the beams pass through the focusing system in a region with a small cross-section that is substantially on the axis of the focusing system. Consequently, there are fewer aberrations than if the electrons were further from the axis of the focusing system.

The result of the above-mentioned operations is the formation of five beam spots 21, 22, 23, 24, and 25 on tape 1 that are arranged along a vertical line with equal separations each having a magnitude that is a function of the amplitude of the signal 12 applied to terminal 14. When this signal becomes more positive, these separations increase. When it becomes more negative, they decrease. These beam spots form lines of charge that extend horizontally on tape 1 when it is moved horizontally by a motor 26 in the direction indicated by the arrow. The resulting lines of charge 21′, 22′, 23′, 24′, and 25′ are illustrated in the enlarged view of FIG. 2.

In FIG. 2 only a portion of tape 1 is illustrated. This is the portion upon which the illustrated wave 12 has controlled the formation of the charge lines 21', 22', 23', 24', and 25'. The resulting charge line pattern is comprised of six regions 27, 28, 29, 30, 31, and 32 corresponding to the six amplitudes of wave 12. Wave 12 is illustrated below tape 1 to better show this correspondence. Initially, wave 12 is zero and thus the separations between the charge lines in the region 27, which is the region corresponding to this zero magnitude, are determined solely by the setting of the arm on potentiometer 10. The significance of this setting is explained later in the discussion of FIG. 3. The next amplitude of wave 12, which is slightly negative, decreases the potential on wires 9 and thus the potential gradients acting upon the electron beams. Consequently, the electron beams converge less, and cross over closer to tape 1 thereby causing the spots 21, 22, 23, 24, and 25 to move closer together and the corresponding charge lines to have smaller separations. The next amplitude of wave 12 is even more negative and thus the charge lines in region 29 have smaller separations. The fourth amplitude of wave 12 is positive, which increases the potential gradient acting upon the beam. Thus, they converge much more and cross over at a point that is much further from tape 1. Therefore, the beam spots 21, 22, 23, 24, and 25 diverge from their former positions thereby spreading the charge lines 21', 22', 23', 24', and 25' in region 30. The next segment of wave 12 is even more positive and thus the charge lines in region 31 are spread even more. Finally, wave 12 returns to zero amplitude at which the separations between the charge lines return to the value determined by the setting of the arm on potentiometer 10.

Wave 12 is illustrated as a stepwave only to more clearly show the correspondence between the amplitude of the applied wave and the separations between the charge lines 21', 22', 23', 24', and 25'. Actually, the applied signal may have any shape. This can be seen from FIG. 2A in which the applied wave is illustrated as a wave 12' having a continuously variable shape. The resulting variation of the separations between charge lines 21', 22', 23', 24', and 25' (illustrated in FIG. 2A) depend upon the amplitude of wave 12' in the same manner as that previously mentioned in the discussion of FIG. 2. But now since the applied wave 12' is continuously variable, the separations between the charge lines are also continuously variable.

While the charge lines are on tape 1, the thermoplastic surface must be in a condition to permit deformation so that these charge lines may form the diffraction gratings. In the illustrated embodiment, this condition is obtained by heating the thermoplastic surface to a plastic condition by electrical energy coupled to the conducting layer in tape 1 by means of capacitance coupling electrodes 33 (in FIG. 1), which are energized by an alternating current source 34. This type heating system is described and claimed in my copending application Serial No. 783,584 filed Dec. 12, 1958, which is assigned to the assignee of the present invention and now abandoned. The heat from the conducting layer is conducted to the thermoplastic surface which then becomes plastic. When the thermoplastic surface has been made plastic the charge lines 21', 22', 23', 24', and 25', which are attracted to the conducting layer in tape 1 or as an alternative to a ground plane beneath it (not shown), deform the thermoplastic surface into lines of depressions that are in the same positions as these charge lines. That is, the depths and separations of these depressions correspond, respectively, to the charge density and separations of these charge lines. After the depression lines have been formed the thermoplastic surface is cooled to preserve these depressions as, for example, by heat conducted to the mylar base.

From the above it is seen that the electron writing apparatus illustrated in FIG. 1 produces lines of depressions in tape 1 the separations between which are determined by the amplitude and polarity of an applied electrical signal 12. The geometry of the components of this electron writing system and the voltages used are correlated to produce separations between the charge lines 21', 22', 23', 24', and 25' which are equal to the desired grating line spacings. These spacings may be of the order of a few microns. Thus, this electron writing apparatus forms diffraction gratings in tape 1 the amplitudes of which are constant but the grating spacings of which vary with the amplitude of the signal 12.

In FIG. 3 there is illustrated a preferred embodiment of my invention for producing an electrical signal output corresponding to the diffraction gratings impressed in tape 1 by the electron writing apparatus of FIG. 1. Preferably, this output signal is identical to the wave 12 to which these diffraction gratings correspond. For simplification, only a portion of the tape 1 is illustrated in FIG. 3. This is the same portion illustrated in FIG. 2. Also, for simplification no means are shown for moving tape 1. But a conventional motor could be used to move tape 1 in the direction indicated by the arrow.

In this readout apparatus, a beam 35 of substantially monochromatic light is produced by a light source 36. The wavelength of this monochromatic light is dependent upon the particular grating spacing of the diffraction grating produced by the electron writing apparatus when there is no applied voltage. The significance of this will be explained later. The diffraction gratings in tape 1 diffract the light beam 35 away from the non-diffracted beam path 37 into two beams 38 and 39 arranged on opposite sides of and at equal angles from the non-diffracted beam path 37. Beams 38 and 39 are partially masked by a masking system comprising an opaque body 40 with two transparent areas 41 and 41', illustrated as slits.

The positions and widths of areas 41 and 41' can be determined from several considerations. As regards their positions, the inner and outer edges of areas 41 and 41', respectively, should be coincident with the centers of beams 38 and 39, respectively, when the diffraction grating diffracting beam 35 is that produced when there is no input signal to the writing apparatus of FIG. 1. That is, the setting on potentiometer 10 is made such that the resulting diffraction grating in tape 1 diffracts beam 35 into two beams 38 and 39, the centers of which are coincident, respectively, with the inner edge of area 41 and the outer edge of area 41'. Of course, this requirement also determines the wavelength of beam 35 since the positions of the centers of beams 38 and 39 are a function of this wavelength as well as the grating spacing of the diffraction grating in tape 1.

With the positions of areas 41 and 41' known, the only other criteria for these areas are their lengths and widths. Their lengths are not critical, but are preferably as long as the corresponding dimensions of beams 38 and 39 in order that as much light as possible is transmitted. The widths are relatively critical. They should be equal and also should be sufficiently narrow that the zero order and second and higher order diffracted light are masked by opaque body 40. That is, these areas should not be coincident with the paths of the zero order and the second and higher order diffracted light. Thus, to determine the widths of areas 41 and 41', these paths must be known.

The zero order diffracted light takes the beam path 37 along the axis of the apparatus. The paths of the second and higher order diffracted light can be determined from the diffraction equation $d=(nl/s)(\lambda)$ wherein $n$ is the order of the diffracted light, $l$ is the distance from tape 1 to the masking system, $\lambda$ is the wavelength of beam 35, $s$ is the grating line spacing and $d$ is the distance between the zero order diffracted light on the masking system and the position of the diffracted light of order $n$. Only the calculation for the path of the second order diffracted light need be made, for if areas 41 and 41' are sufficiently narrow that they do not transmit the second order diffracted light, they will not transmit higher orders of diffracted light.

The light transmitted by areas 41 and 41' is detected by a light responsive circuit including light responsive means illustrated as two photomultipliers 42 and 42' positioned behind areas 41 and 41', respectively. (To simplify the illustration, the sources for energizing the elements of photomultipliers 42 and 42' have not been illustrated.) The electrical output signal from photomultiplier 42, which is indicative of the light transmitted by area 41, is applied to the cathode electrode of an electron tube 43, across a cathode resistor 44. The output electrical signal from photomultiplier 42', which is representative of the light transmitted by area 41', is applied to the grid electrode of this tube 43, across a resistor 45. Resistor 45 is terminated in a potentiometer arrangement 46 that provides bias for tube 43.

The light responsive circuit in which tube 43 is an active element produces an output signal representative of the difference in signals applied from photomultiplier tubes 42 and 42'. With the output signal from tube 42 applied to the cathode electrode, and the output signal from tube 24' applied to the grid electrode, the voltage appearing across the plate resistor 47 is the difference in the output signal from photomultiplier tubes 42 and 42' or a multiple thereof. Of course this varying signal is superimposed upon a plate direct voltage. This direct voltage is obtained from a direct voltage source (not shown) connected to a terminal 48. The difference varying wave at the plate of tube 43 is coupled through a capacitor 49, which blocks the plate direct voltage, to an output terminal 50. The resulting alternating output wave 51, appearing at the output terminal 50, is proportional to the input wave 12 applied to the writing apparatus of FIG. 1.

The operation of the circuit of FIG. 3 can best be understood by reference to FIG. 4 in which a response graph for the circuit of FIG. 3 is illustrated. The ordinate units of this graph are in amplitude of the output signal appearing at terminal 50. The abscissa units are in grating spacings for the diffraction gratings in tape 1. In this graph, the origin, as related to the abscissa axis, is the grating spacing produced when there is no applied wave 12 to the electron writing system of FIG. 1. That is, it is the grating spacing produced by the setting of the arm on potentiometer 10. For larger grating spacings, the output signal 51 from the difference amplifier circuit is a positive voltage that for grating spacings within the operating range varies linearly with the sizes of the grating spacings. For smaller gratings spacings, the output electrical signal 51 is a negative voltage that for grating spacings within the operating range varies inversely with the sizes of the grating spacings.

Only a few points on the graph will be considered in the following discussion of the operation of the optical apparatus of FIG. 3. Consider first the point of operation at the origin. As mentioned above, this point corresponds to zero amplitude wave 12 applied to the beam splitter in FIG. 1. And, as previously mentioned, when there is no input wave 12 the edges of areas 41 and 41' in the masking system split light beams 38 and 39 such that one half of each beam is transmitted by the respective areas. Then the same amount of light is transmitted by areas 41 and 41' and the output signals from photomultiplier tubes 42 and 42' are equal. As a consequence, the electrical circuit, which produces an output signal that is representative of the difference in outputs of these two photomultipliers, produces a zero output signal at terminal 50.

Next, consider the operation when wave 12 is negative and thus the grating line spacings are narrower than when there is no input signal. The narrower grating line spacings cause, as can be determined from the diffraction equation, the beams 38 and 39 to diverge at a larger angle from the non-diffracted beam path 37. Beam 38 then moves to the left which is in a direction such that a greater percentage of it is transmitted by area 41. On the other hand, beam 39 moves to the right, away from area 41'. Thus, less of it is transmitted by area 41'. Consequently, photomultiplier tube 42 applies a more negative signal to the cathode electrode of tube 43 while tube 42' applies a less negative signal to the grid electrode. The result of both changes in signals is an increase in current through tube 43 and thus a greater voltage drop across resistor 47. This greater voltage drop causes a decrease in voltage at the plate electrode of tube 43, which appears as a negative voltage at terminal 50.

Now consider the operation when the applied wave 12 is positive and thus the grating line spacings are larger. This increase in grating line spacing causes the beams 38 and 39 to converge towards the non-diffracted beam path 37. Beam 38 moves to the right, away from area 41. And beam 39 moves to the left, more towards area 41'. As a result, the light transmitted by area 41 decreases and that transmitted by area 41' increases. The decreased light on tube 42 lowers the negative potential (i.e. makes it more positive) applied from this tube to the cathode electrode of tube 43. The increased light on tube 42' increases the negative potential applied to the grid electrode of tube 43. Both changes in voltage decrease the current conducted by tube 43. Thus, there is less voltage drop across plate resistor 47 and, consequently, a raising of the potential at the plate electrode of tube 43. This increased voltage appears as a positive voltage at output terminal 50.

From the above, it is seen that the output wave 51 corresponds in polarity to the input wave 12 applied to the electron writing apparatus of FIG. 1. And from conventional electron tube considerations it should be evident that this correspondence can be made linear through adjustment of the bias voltage from potentiometer 46 such that when wave 12 has an amplitude of a certain voltage the output wave 51 appearing at terminal 50 also has this same voltage.

To summarize the operation of the storage system of FIG. 1 and 3, this preferred embodiment, in response to an applied electrical signal, stores the electrical signal or rather the intelligence thereof, in the form of diffraction gratings in a light modulating medium. It is the grating spacings of these diffraction gratings that carry the intelligence of the applied electrical signal. These diffraction gratings are produced by lines of electron charge that in turn are produced by an electron writing apparatus which forms a plurality of beam spots along a line on the tape the separations between which are controlled by the applied electrical signal. When this tape is moved these beam spots produce the desired lines of charge. Upon heating the thermoplastic tape to a plastic condition these lines of electron charge produce corresponding grating lines.

When it is desired to reproduce the electrical signal, this thermoplastic tape is run through an optical apparatus which produces a beam of substantially monochromatic light. This light is diffracted by the diffraction gratings such that a portion of it is incident on two transparent areas of a masking system. The amount of light transmitted by the respective transparent areas is a function of the grating line spacings. Photomultiplier tubes detect the light transmitted by these transparent areas and produce ouput signals that are applied to an electrical circuit. The output signal from this circuit is a function of the difference of the two photomultiplier signals, and is a reproduction of the applied electrical signal.

It should be realized that the readout apparatus may be used directly in conjunction with the writing apparatus. That is, the readout apparatus of FIG. 3 could have been illustrated in FIG. 1 to the left of the writing apparatus. Or, if a reversible motor 26 is employed, could be placed at the right of the writing system. The readout can be done immediately after diffraction gratings have been formed or at any time later.

The storage system illustrated in FIGS. 1 and 3 stores and reads out analog as well as digital information. However, for a purely digital readout operation the readout apparatus illustrated in FIG. 5 is preferred. Complete information storage systems utilizing the readout apparatus of FIG. 5 and also of FIG. 7 are described and claimed in the copending application Serial No. 756,775, filed August 25, 1958 and assigned to the assignee of the present invention. The present discussion will be limited solely to the readout apparatus.

A preferred light modulating medium for utilization with the apparatus of FIG. 5 is a portion of a single plate of the type described in the above-mentioned patent application Serial No. 756,775. This plate comprises a transparent preferably optically clear structurally rigid base 52, such as glass, that is covered with a transparent conducting coating 53 that may be, for example, tin oxide. A transparent thermoplastic film 54 extends over coating 2.

Each plate may be approximately 1 inch by 1 inch square, accommodating 64 x 64 blocks 55 of bits of information, with each block containing 32 x 32 bits of information in binary digital form. For simplification, only a few greatly enlarged blocks are illustrated. The sizes and separations of these blocks 55 are not critical and for the mentioned dimensions may be 1/28 inch on a side with spacings 56 of 1/128 inch. If desired, blocks 55 may be rectangular.

Each bit of information comprises one of two phase diffraction gratings distinguishable only by their grating spacings which preferably differ by a factor of one and a half. The grating spacings for the two diffraction gratings should have substantially different dimensions, but if they differ by a factor of 2 or more, adverse second order effects are introduced that more than offset the advantages obtained by the wide difference in grating spacings.

The electron writing apparatus that forms the diffraction gratings may be the same as that illustrated in FIG. 1 with the addition of means for moving the plate in two directions so that an area scan of the plate is produced by the electron beam. Or, alternatively, the plate can be moved in one direction and the electron beam spots deflected in a direction normal to this one direction and the areawise coverage obtained.

As is conventional in a binary digital system, the information stored is in the form of zeroes and ones. That is, one type of diffraction grating corresponds to the zeroes and the other to the ones. Thus, each block 55 comprises 32 x 32 diffraction gratings arranged in 32 rows with 32 in each row.

Returning now to the optical readout apparatus of FIG. 5, there is illustrated schematically a light generating component 57 which is a flying spot scanner. Flying spot scanners are well known and are very similar to a conventional cathode ray tube circuit except for the screen of the tube, which has low persistence, or, in other words, little "after-glow." As a result, the generated light is a spot directly over where the electron beam strikes the screen. The beam is deflected over the screen in an area-wise scan in a conventional manner. Thus, the light spot appears to move in parallel horizontal lines across the width of the screen. The deflection rate depends upon the desired reading rate and the limit set by the persistence of the screen of the scanner. That is, this spot of light, which is utilized to illuminate the diffraction gratings, must illuminate only one diffraction grating or bit at a time. Thus, before illuminating one bit its illumination of the previous bit must have diminished to a low light level. If the illumination of one bit is termed a cycle, the frequency of operation of this system may be in megacycles per second.

The size of the spot of light required in the flying spot scanner 57 is determined by the bit size and the magnification in the optical system. It should be no larger than that required to illuminate one bit.

The beam from flying spot scanner 57, illustrated as a line 58, is filtered by a filter 59 that limits the light to substantially one color, thus making it substantially monochromatic. Preferably, for maximum light transmission, the wavelength of peak light transmission of filter 59 agrees with the wavelength of peak light output from the screen of the flying spot scanner 57. Also, the color of the monochromatic light is preferably within the visible range.

The light beam 58 transmitted by filter 59 is imaged by an objective lens assembly illustrated schematically as a single lens 60 to a small area on film 54 covering only one bit or a portion thereof. Lens assembly 60 may, for example, be a standard microscope objective lens.

A first masking system 61, preferably positioned on or close to the principal plane of lens assembly 60, has an aperture 62 for the passage of most of the light beam 58. Aperture 62, which can be better seen in the plan view of FIG. 5*a*, is a slot with its narrow dimension or width parallel to the direction of diffraction by the diffraction gratings in film 54. More will be said later about this width. The longitudinal dimension of aperture 62 should at least be equal to the corresponding dimension of beam 58 in order that as much light as possible is transmitted by aperture 62.

Since aperture 62 is in the form of a slot, the spot of light focused on thermoplastic film 54 by lens assembly 60 is an ellipse having its minor axis parallel to the length of aperture 62. If the bits are rectangles with their long dimensions parallel to the major axis of this ellipse, this arrangement is satisfactory. It even may be satisfactory if the bits are square even though the ellipse obviously covers only a small portion of a bit. A larger portion of the square bits can be covered if the originating source of light in the flying spot scanner 57 is made an ellipse, that is if the electron beam is focused to an ellipse, with the major axis parallel to the longitudinal dimension of aperture 62. Then the light focused on film 54 is approximately a circle. This arrangement does not give as good resolution in the direction parallel to the long dimension of slot 62 but increases the illumination.

In the film 54 of FIG. 5 there is illustrated, in greatly enlarged form, depressions 63 and elevations 64 corresponding to a plurality of bits. Every five adjacent depressions 63 and elevations 64 form a single bit. The grating spacing of a diffraction grating corresponding to a bit is the spacing between adjacent depressions 63.

The range of the grating spacings for suitable diffraction gratings can be determined from the diffraction equation $\sin \theta = \lambda n/s$ and other considerations discussed below. In this equation $\theta$ is the angle formed between a line from the $n$th order diffraction pattern to the bit diffracting the light and a line from the zero order diffraction pattern to this bit, $\lambda$ is the wavelength of the monochromatic light in beam 58, and $s$ is the grating spacing of the pertinent diffraction grating. Since most of the diffracted light is in the first order diffraction pattern, only this light is used. Thus, $n$ equals one. The equation then becomes $\sin \theta = \lambda / s$. $\theta$ is fixed within limits because large angles of diffraction of approximately 15 to 50 degrees are desired. Also, the wavelength $\lambda$ is determined within a range because, as previously mentioned, beam 58 is preferably within the visible light spectrum. Since $s$ is the only remaining element of the diffraction equation, and the other elements are fixed within ranges, then $s$ is also determined within a range. This range extends from a little under one micron to several microns.

The light diffracted by the diffraction gratings in film 54 is detected by two photosensitive devices 65 and 66 that produce output electrical signals resistors 67 and 68 respectively, to output terminals 69 and 70, respectively. These photosensitive devices may be the photomultipliers previously mentioned. They are positioned at two different angles from the line of the zero order diffracted light, which is along the system axis. Device 65 is positioned at the diffraction angle corresponding to the light diffracted by one diffraction grating forming the bits and the other device 66 at the diffraction angle corresponding to the light diffracted by the other diffraction grating. One angle may be, for example, 18° and the other 27°, the particular angles depending of course, on the wavelength of the monochromatic beam 58 and upon the grating spacings of the diffraction gratings. These angles should be as largely different as possible to avoid significant overlap of the two patterns of diffracted light. But, as previously explained, if they are made too different some light from one or both of the second order diffraction patterns may be intercepted by these devices 65 and 66.

Since the diffracted light occurs on both sides of the zero order and diffracted light, one device 65 may be placed on one side and the other device 66 on the other side, thus avoiding physical interference between these two devices. However, if they are small, four devices, two on both sides, may be used with the corresponding ones joined in parallel to provide greater output electrical signals.

The diffracted light is focused on devices 65 and 66 by a lens 71 positioned close to film 54.

The width of the diffracted light beams depends upon three factors: the magnification in the system, the width of aperture 62 and the number of grating lines in each diffraction grating. As regards magnification, of course, the greater the magnification of the system the greater the widths of the diffracted beams. Also, the widths of these beams depend upon the width of aperture 62 since lens system 71 focuses the light transmitted by aperture 62 on devices 65 and 66. That is, the image of aperture 62 is focused on devices 65 and 66. The wider aperture 62 is the wider this image. Also, the width depends upon the number of grating lines in each diffraction grating since the greater the number of grating lines the narrower the diffracted beams, providing the grating spacings are maintained constant.

If the images of the diffracted light beams are too wide, the image for the light diffracted by one diffraction grating overlaps that for others. Then one photosensitive device may be energized by two diffraction patterns instead of the desired one. As previously explained, the photosensitive devices 65 and 66 should respond only to light diffracted by different diffraction gratings. Thus, if the diffraction pattern overlap is of such a degree that both diffraction patterns are incident on both sensitive device 65 and 66, each diffraction grating will produce an output from both photosensitive devices 65 and 66 and the system will not operate. If the photosensitive devices 65 and 66 are so large that light from both diffraction patterns are incident on both devices, masking systems 72 and 73 having apertures 74 and 75 respectively, should be placed in front of these devices to transmit only light from different diffraction patterns. When these masking systems are used lens 71 images the diffracted light from aperture 62 on these masking systems rather than on devices 65 and 66.

Some other criteria for the width of aperture 62 should be mentioned. The narrower aperture 62 is the wider the beam spots on film 54 in the direction parallel with this width. Obviously, the width of aperture 62 should not be so narrow that the width of the beam spot extends beyond a diffraction grating. Also, the width of aperture 62 should not be so narrow that light is significantly diffracted at the edges of this aperture 62. And preferably, the width of the light beam determined by the number of grating lines corresponds very closely to the width of the light beam determined by the width of aperture 62.

To illustrate suitable dimensions for a typical system, two diffraction gratings may be used with respective grating spacings of two and three microns. Lens assembly 60 may be positioned approximately 2 inches from film 54 and 12 inches from the flying spot scanner 57. It may have a focal length of 48 millimeters. Photosensitive devices 65 and 66 may be positioned approximately 6 inches from film 54. The light spot size on film 54 may be approximately 15 microns in diameter with the bits approximately the same size. The dimensions of apertures 62, 74, 75 may be one-eighth inch by one inch.

In the operation of the system of FIG. 5, a positioning device such as is described in the above-mentioned patent application Serial No. 756,775, positions the desired block 55 of bits in the area covered by the deflecting light beam 58. Then the readout cycle may be initiated by, for example, the controller unit described in the above-mentioned patent application. The beam of light 58 then moves horizontally along the lines of bits illuminating one bit at a time. As each bit is illuminated, light is diffracted to either device 65 or 66 depending upon the grating spacing of the diffraction grating corresponding to that bit. Thus, there is an output voltage generated at terminal 69 or terminal 70 each time a bit is illuminated. Of course, the output voltage from one terminal, say terminal 69, corresponds to ones and at the other terminal 70 to zeroes. This information can be applied, for example, to an output logic circuit in an information system.

As the light spot from beam 58 makes its area scan, light is deflected over the area of block 55 and thus information is obtained from the whole block. Each horizontal scan of the beam 58 corresponds to a different horizontal row of bits. Sufficient number of horizontal scans are made to cover the whole block 55.

Any dust spot on the film 54 diffracts light to both devices 65 and 66. Consequently, noise signals can be eliminated by utilizing a coincidence circuit (not shown) which prevents signals from terminal 69 and 70 from reaching the output logic circuit when there are simultaneous output signals on the two terminals 69 and 70.

Although this embodiment of my invention has been described with reference to a computer application, it may be used in any application in which information is stored in binary digital form. Also, intensity diffraction gratings rather than phase diffraction gratings may be used. And the light modulating medium need not be a thermoplastic film, nor need it be in the form of a plate. Other specially suitable forms are tapes and cylinders.

In some readout apparatus applications it may be desirable to illuminate a whole block 55 at a time rather than just one bit. In such applications the embodiment of my invention illustrated in FIG. 7 may be used. In this system two light sources 76 and 77 connected across a source of electrical energy 78 produce multi-colored light. Sources 76 and 77 may, for example, be xenon arc amps. They both serve the same purpose and thus are positioned the same distance from the vertical center line of the apparatus. Only one is required but with two, twice as much light is available. Light from sources 76 and 77 is imaged by objective lenses 79 and 80, respectively, to preferably cover only one block 55 on film 54. The block 55 from which information is to be read will have been previously positioned in the path of this light by means not illustrated.

As in the FIG. 5 embodiment, the diffraction gratings in film 54 in the FIG. 7 embodiment are of two types, one having a grating spacing of approximately one and one-half times that of the other. Of course, one grating spacing corresponds to ones and the other grating spacing to zeroes.

The position of sources 76 and 77 from the vertical axis of the apparatus should be such that two different colors of substantially different wavelengths are diffracted by the two diffraction gratings in the same direction, for example, along the apparatus vertical axis. If the two selected colors are yellow and blue, then the angle between the lines from the block 55 to sources 76 and 77 and vertical axis should be aproximately 11.4 degrees for the above-mentioned grating spacings of two and three microns.

Masking systems 81 and 82 having slots 83 and 84 are placed, respectively, in the paths of the light beams from sources 76 and 77. The length of these slots 83 and 84 in the direction normal to the direction of diffraction should be as long as is practicable so as to transmit as much light as possible. Their widths in the direction of diffraction must be within certain limits, as is explained below.

The light diffracted by the diffraction gratings in film 54 is masked by a light mask 85 having an aperture 86 dimensioned to pass only, for example, the yellow light in the diffraction pattern produced by one type diffraction grating and only the blue light from the diffraction pattern produced by the other type diffraction grating. This diffracted light is focused on masking system 85 by a lens system 87.

The widths of apertures 83, 84, and 86 in the direction of diffraction depends upon the desired color purity for the light transmitted by aperture 86. For example, the transmited blue light should not extend over such a wide wavelength band that some of it is passed by the following components (yet to be described) that separate out the yellow light. And similarly, the yellow light should not extend over such a wide wavelength band that a significant portion of it is passed by the components that separate out the blue light. On the other hand, the wider the wavelength band transmitted, the greater the intensity of the transmitted light. Thus, the selected widths for apertures 83, 84, and 86 are a matter of compromise between color purity and light intensity. In my copending application Serial No. 782,956 filed Dec. 24, 1956 now Patent 3,044,358, which is assigned to the assignee of the present invention, a detailed explanation is presented on the determination of these aperture widths. However, in general it may be said that the width of aperture 86 in the direction of diffraction is approximately ¼ to ⅛ the distance from the center of this aperture to the point on a masking system 85 for the non-diffracted light. And if there is no magnification or demagnification, the widths of apertures 83 and 84 are approximately equal to this width of aperture 86. However, the exact widths depend upon the desired color purity.

The diffracted blue and yellow light from the respective diffraction gratings that is transmitted by aperture 86 is focused by a projection lens 88, the yellow light on a television camera 89 and the blue light on a television camera 90, after reflection from a dichroic mirror 91. Mirror 91 transmits the yellow light while reflecting the blue light. A yellow filter 92 is placed in front of camera 89 and a blue filter 93 in front of camera 90 to enhance the action of mirror 91. Camera 89 produces an output electrical signal across a resistor 94 which signal is available at terminal 95. Similarly, television camera 90 produces an output electrical signal across a resistor 96 that is available at a terminal 97.

Lens 88 images the surface of film 54 on the screens of tubes 89 and 90 such that checkerboard type patterns are formed on these screens. On the screen of tube 89 there will be yellow light spots corresponding to the diffraction gratings in block 55 that diffracted yellow light through aperture 86 while there will be black spots corresponding to the positions of the other type diffraction grating. Correspondingly, on the screen of tube 90 there will be bright spots corresponding to the diffraction gratings that diffracted blue light through aperture 86 while there will be black spots for the position corresponding to the other diffraction gratings. Thus, if the two checkerboard patterns on screens of tubes 89 and 90 are superimposed a completely illuminated pattern is obtained with 32 rows of 32 spots of light.

Cameras 89 and 90, which must be operated in synchronism, have deflection coils 98 and 99, respectively, that are energized with the same horizontal and vertical deflection signals from a source 100 that generates the signals when triggered by pulses applied an input terminal 101.

The position of the electron beam on the screen of tube 89 must correspond at all times very closely to that of the beam on the screen of tube 90. Thus, not only the same deflection signals should be used, but also the deflection components of both tubes 89 and 90 should be substantially identical. Also, of course, these tubes 89 and 90 must be positioned such that there is optical registry of the two images on the screens of these tubes.

Cameras 89 and 90 may be either color or black and white camera tubes. Also, the type of camera tube is not pertinent to the present invention. They may be, for example, vidicons or orthicons or image orthicons.

In the operation of the system of FIG. 7, the positioning means, not shown, positions plate 52 such that the block 55 from which information is to be read is illuminated by the beams from sources 76 and 77. Then a pulse is applied to the deflection signals source 100 at terminal 101 to commence the operation of the camera tubes 89 and 90. If this system is used in an information storage system, such as is described in the above-mentioned application Serial No. 756,775, a programmer unit may be used to apply the trigger pulse to terminal 101. Upon the initiation of deflection, the electron beams in tubes 89 and 90 commence scanning over the respective screens in synchronism with one another. Each horizontal scan of these electron beams correspond to a horizontal line of bits and also the beams are preferably just large enough to cover an area that is illuminated by light diffracted by a single bit. Assume the first bit in the first row of block 55 is a diffraction grating that diffracts yellow light through aperture 86.

Then when the electron beams from camera tubes 89 and 90 are in these corresponding positions, only camera tube 89 produces an output signal, which signal appears at terminal 95. As previously explained, this diffraction grating will have caused screen of tube 89 to be illuminated at this corresponding position while due to the action of mirror 91 and filter 93 there will be no light at this corresponding spot on the screen of tube 90. If the second bit in the first row is a diffraction grating that diffracts blue light through aperture 86, then when the electron beams in camera tubes 89 and 90 move over to the positions corresponding to the position of this bit, then only camera tube 90 produces an output signal, which signal appears at terminal 97. Thus, during the readout cycle as electron beams in tubes 89 and 90 deflect over the screen electrodes, output signals are produced at terminals 95 and 97 as a function of the position of the electron beams and of the grating lines spacings of the diffraction gratings in the film 54. If at any time there is a simultaneous electrical output signal appearing at terminals 95 and 97, this is an indication of noise that may be due to a dust spot upon film 54. A coincidence circuit can be included to reject information from terminals 95 and 97 when there are simultaneous electrical output signals.

The particular application in which the system of FIG. 7 is used is not pertinent to the present invention. It may, for example, be used in an information storage system such as is described in the above-mentioned application Serial No. 756,778, in which case the output electrical signals from terminals 95 and 97 will be connected to the input of the output logical circuit.

There are several modifications of the system of FIG. 7 that should be apparent from the above discussion. For example, a single light source may be used that is positioned on the axis of the optical signal. Also, the two camera tubes 89 and 90 may be positioned at different angles from the axis of the optical system corresponding to the diffraction angles of the desired light diffracted by the two diffraction gratings. However, with the illustrated embodiment, it is easier to obtain optical registry of the images on the screens of tubes 89 and 90 and also several light sources can be used instead of one, which increases the intensity of light projected on screens of tubes 89 and 90.

In the above-described embodiments of my invention, only the grating spacing parameter of diffraction gratings are used for storing information. However, phase diffraction gratings have another parameter—the amplitude. In another embodiment of my invention, illustrated in FIGS. 8 and 9, information is stored as the amplitudes of diffraction gratings.

In FIG. 8 there is illustrated only the electron gun portion of a preferred electron writing apparatus that forms diffraction gratings the amplitudes of which correspond to the amplitudes of an applied signal. These diffraction gratings comprise a single grating line the amplitude of which—i.e. the depth—varies along the length of medium 1 in accordance with the variation in the amplitude of the applied signal. The focusing system and the heating system for this apparatus may be the same as that illustrated in FIG. 1.

In the electron gun of FIG. 8 there are no wires across aperture 8 in anode 7. Thus, there is no beam splitting and a single line of charge is formed on medium 1. The input signal is consequently, applied to control electrode 4 instead of to beam splitting wires. This signal is illustrated as originating from a source 102, which may be a source of any amplitude varying electrical signal that it is desired to record. With the signal applied to electrode 4, the magnitude of beam current varies with the amplitude of the applied signal. Consequently, the density of the charge line varies with the amplitude of the applied signal—the more positive the signal, the greater the charge density.

The amplitude of the grating line depends upon the charge density of the charge line. The greater the charge density, the greater is the force on medium 1. And the greater this force, the greater is depth of the resulting deformation.

With the charge density dependent upon the applied signal, and the depth of the deformation dependent upon the charge density, the amplitude of the single grating line produced by the single charge line depends upon the amplitude of the applied signal.

In FIG. 9 there is illustrated an optical apparatus for producing an electrical output signal the amplitude of which varies with the amplitude of the grating line in medium 1. In this optical apparatus light is produced by a light source 103 and focused by a lens 104 onto a small region of the diffraction grating line in medium 1. Successively different regions of this grating line are illuminated due to the movement of medium 1, which movement is provided by a motor 26. Between medium 1 and a source 103 a first light mask is provided in which there are preferably a plurality of horizontal slits 106 that transmit light. When there is no diffraction grating line in medium 1, the light from source 103 transmitted by slits 106 is focused by a lens 107 on opaque areas of a second light mask 108. To be more specific, light from each slit 106 is focused on a different opaque bar between slits 109. But when there is a diffraction grating line, it diffracts light through slits 109 as a function of its amplitude. The greater the amplitude the greater the amount of light diffracted through slits 109.

From the above it is seen that the first and second light mask is a Schlieren optical arrangement.

The amount of light diffracted through slits 109 is detected by a light responsive circuit. This circuit includes a photomultiplier tube 110 that produces an output electrical signal across a resistor 111 as a function of the amount of light incident on tube 110. This signal can be abstracted from a terminal 112.

In the operation of this optical apparatus, when the portion of the diffraction grating line illuminated by the spot of light has a large amplitude, it diffracts a relatively large amount of light through slits 109. When the diffraction grating line is of lesser amplitude, it diffracts less light through slits 109, and thus tube 110 produces a lesser magnitude signal across resistor 111. Consequently, the signal developed across resistor 111 is a function of the amplitude of the diffraction grating line. And since this amplitude is a function of the input signal applied to the control electrode 4, the output signal developed across resistor 111 is a function of this input signal. This is the desired result.

For proper operation, the spot of light should illuminate such a small region of the grating line that the amplitude of the grating line in this region is substantially constant. Then almost all of the variations in amplitude of this grating line will appear as variations in amplitude of the output electrical signal developed across resistor 111.

In summary, an information storage system has been provided in which information is stored in the form of diffraction gratings. In a preferred embodiment this information is in the form of diffraction grating spacings of diffraction gratings formed by an electron writing apparatus that produces lines of electron charge on a deformable light modulating medium. These lines of electron charge are electrostatically attracted to deform the deformable medium into diffraction gratings, the grating spacings of which correspond to the separations between the lines of charge. Several readout embodiments are illustrated. In a preferred analog readout apparatus, two light sensitive devices are placed behind two apertures in a light mask positioned such that when the grating spacing is increased, more light is directed to one photosensitive device than to the other, while when the grating line spacings are decreased the opposite result is obtained. In a preferred digital readout system two photosensitive devices are placed at two different angles from the optical apparatus axis, which angles correspond to the diffraction angles of monochromatic light that is diffracted by two types of diffraction gratings in the modulating medium. A flying spot scanner is utilized to produce an area-wise illumination over a block of bits of diffraction gratings. In another digital optical readout apparatus, camera tubes are used the screens of which are energized by different colored light resulting from diffraction by two types of diffraction gratings in the light modulating medium. In this system the whole block of bits is illuminated. In another electron writing apparatus, information is stored as an amplitude variation of a diffraction grating line. An optical readout apparatus for transducing these diffraction grating amplitudes is provided with a masking system that transmits light as a function of the amplitudes of the diffraction grating line. A light responsive circuit generates an output signal that corresponds to the light transmitted by the masking system.

While the invention has been described with respect to certain specific embodiments, it will be appreciated that many modificaitons and changes may be made by those skilled in the art without departing from the spirit of the invention. I intend, therefore, by the appended claims to cover such modifications and changes as fall within the true spirit and scope of my invention.

What I claim as new and desire to secure by Letters Patent of the United States is:

1. In an information storage system the combination of an information storage medium having bits of information of different types stored over an area of said medium with information of one type stored as diffraction gratings of one spacing and information of a second type stored as diffraction gratings of a different spacing, said gratings having the form of thickness deformations of the medium which are retained independently of the forces applied to the medium to form the gratings and store the information, means for illuminating an area of said medium, a pair of light responsive means each for producing electrical signals as a function of light incident on a light receiving surface thereof, and light transmission limiting means interposed in the paths of light emanating from a discrete area on said medium and the respective light receiving surfaces of said light responsive means and cooperating with said gratings and with the position of said light receiving surfaces to transmit diffracted light emanating from a discrete area of said medium to the light receiving surface of only one of said light responsive means when diffracted by a grating of said one spacing at said discrete area and to transmit diffracted light emanating from said discrete area only to the light receiving surface of the other of said light responsive means when diffracted by a grating of said second spacing at said discrete area.

2. In an information storage system the combination of an information storage medium having bits of information of different types stored over discrete areas of said medium with information of one type stored as diffraction gratings of one spacing and information of a second type stored as diffraction gratings of a different spacing, said gratings having the form of thickness deformations of the medium which are retained independently of the forces applied to the medium to form the gratings and store the information, means for projecting a substantially monochromatic spot of light on said medium having a transverse dimension approximately equal to the width of one of said discrete areas, means for producing relative movement between said spot of light and said medium whereby successive discrete areas are illuminated, a masking system positioned in the path of light emanating from said medium for partially masking the light from said spot of light diffracted by said diffraction gratings, said masking system having two apertures of such width and separated by such a distance in the direction of diffraction that first order light diffracted by a diffraction grating of said one spacing at a discrete area of said medium is transmitted only through one of said apertures and first order light diffracted by a diffraction grating of said second spacing at said same discrete area is transmitted only through the other of said apertures, and a light responsive means positioned behind each of said apertures for producing output electrical signals in response to the light transmitted by the respective apertures.

3. The combination as defined in claim 2 and an electrical circuit for producing a different output electrical signal in response to the two output electrical signals from said light responsive means to minimize the output produced by unwanted random diffraction produced by optical defects in and on said medium.

4. In an information storage system the combination of an information storage medium having bits of information of different types stored over discrete areas of said medium with information of one type stored as diffraction gratings of one spacing and information of a second type stored as diffraction gratings of a different spacing, said gratings having the form of thickness deformations of the medium which are retained independently of the forces applied to the medium to form the gratings and store the information, means for projecting a substantially monochromatic spot of light on said medium having a transverse dimension approximately equal to the width of one of said discrete areas, means for producing relative movement between said spot of light and said medium whereby successive discrete areas are illuminated, a masking system positioned in the path of light emanating from said medium for partially masking the light from said spot of light diffracted by said diffraction gratings, said masking system having two apertures positioned such that for one diffraction grating spacing intermediate the grating spacing corresponding to the said one and said second types of information the two beams of the first order diffracted light from diffraction by said diffraction grating of intermediate spacing are bisected by the edges of said apertures, one beam being bisected by the one edge of one aperture and the other beam being bisected by the opposite edge of the other of said apertures, a light responsive means positioned behind one of said apertures and a second light responsive means positioned behind the other of said apertures for producing output electrical signals in response to the light transmitted by the respective apertures.

5. The combination as defined in claim 4 with an electrical circuit interconnecting said light responsive means for producing a difference output electrical signal in response to the two output electrical signals from said light responsive means.

6. In an information storage system the combination of an information storage medium having bits of information of different types stored over an area of said medium with information of one type stored as diffraction gratings of one spacing and information of a second type stored as diffraction gratings of a different spacing, said gratings having the form of thickness deformations of the medium which are retained independently of the forces applied to the medium to form the gratings and store the information, means for illuminating an area of said medium with polychrome light, a pair of electron cameras each for producing electrical signals as a function of light incident on a light receiving surface thereof, and light transmission limiting means including color selective means interposed in the paths of light emanating from said area of said medium and the respective light receiving surfaces of said electron cameras and cooperating with said gratings and with the position of said light receiving surfaces to transmit substantially only one color light emanating from said area of said medium to one of said electron cameras and to transmit substantially only light of a different color emanating from said area to the light receiving surface of the other of said electron cameras.

7. In an information storage system the combination of an information storage medium having bits of information of different types stored over an area of said medium with information of one type stored as diffraction gratings of one spacing and information of a second type stored as diffraction gratings of a different spacing, said gratings having the form of thickness deformations of the medium which are retained independently of the forces applied to the medium to form the gratings and store the information, electron camera means equal in number to the number of different diffraction grating spacings used to store information and each including an electron beam for scanning an area of said camera means, means projecting polychrome light on an area of said medium, and masking means including color selective means interposed between said medium and said electron camera means in the paths of light emanating from said area of said medium and cooperating with said gratings of different spacings to transmit to one of said camera means only light of one color as determined by gratings of one spacing and to the other of said camera means only light of a second color as determined by the gratings having the second spacing.

8. In an information storage system the combination of an information storage medium having bits of information of different types stored over an area of said medium with information of one type stored as diffraction gratings of one spacing and information of a second type stored as diffraction gratings of a different spacing, said gratings having the form of thickness deformations of the medium which are retained independently of the forces applied to the medium to form the gratings and store the information, electron camera means equal in number to the number of different diffraction grating spacings used to store information and each including an electron beam for scanning an area of said camera means, means projecting polychrome light on an area of said medium, masking means including color selective means interposed between said medium and said electron camera means in the paths of light emanating from said area of said medium and cooperating with said gratings of different spacings to transmit to one of said camera means only light of one color as determined by gratings of one spacing and to the other of said camera means only light of a second color as determined by the gratings having the second spacing, and means for synchronizing the scanning of said areas by the corresponding electron beams so that the electrical output produced by each of said cameras is at any instant dependent upon the spacing of the diffraction grating formed in the corresponding point of said medium.

References Cited by the Examiner

UNITED STATES PATENTS

| | | | |
|---|---|---|---|
| 2,813,146 | 11/1957 | Glenn | 340—173 |
| 2,853,357 | 9/1958 | Barber | 340—173 |

BERNARD KONICK, *Primary Examiner*.

T. W. FEARS. *Assistant Examiner*.